Patented Sept. 6, 1927.

1,641,844

UNITED STATES PATENT OFFICE.

WINFIELD S. FISHER, OF ELMHURST, ILLINOIS.

TOOTH-CANAL-FILLING COMPOUND.

No Drawing.   Application filed April 28, 1926.   Serial No. 105,269.

This invention relates to dentistry and pertains particularly to improvements in tooth root canal filling substances.

The primary object of this invention is the provision, in a manner as hereinafter set forth, of a filling material for root canals of teeth which is adapted, by reason of its peculiar physical properties, to preserve the form in which it is molded, until it is packed in the root canal whereupon the slight pressure necessary to force the material into place in the root canal causes it to break up and assume a more or less pulverized condition thus enabling the substance to be forced into all irregularities of the canal. Further pressure upon the substance causes these particles to bond together into a dense, impervious compact mass to completely close the canal, and hermetically seal the same.

Another object of the invention is the provision, in a manner as hereinafter set forth, of a root canal filling material having the above described properties and further possessing a slight stickiness, by reason of which it is caused to adhere to the wall of the root canal and maintain its form therein without any later change in volume.

A further object of the invention is the provision, in a manner as hereinafter set forth, of a root canal filling material of such nature that it can be placed directly into the tooth root canal without the usual perliminary heating, partial dissolving, softening or lubricating which is necessary in using filling materials of the types at present in use.

The invention will be best understood from a consideration of the following detailed description, with the understanding that the invention is not confined to any strict conformity with the process outlined, but may be changed and modified so long as such changes and modifications mark no material departure from the salient features of the process and formula set forth, as expressed in the appended claims.

The formula for the material embodying this invention is as follows:—

Oil of eucalyptus, 12 minims; zinc oxide powder, 14 grains; rosin (powdered), 2 grains.

Applicant has found through extensive experimentation that the above set forth quantities of ingredients gives a material superior to any other thus far produced.

The process followed in preparing the substance is as follows:—

The rosin is first ground to an impalpable powder. The oil of eucalyptus is then added drop by drop upon the rosin and while thus being dropped thereon is thoroughly incorporated by spatulation until the designated amount of eucalyptus has been used after which the spatulation is continued until a perfectly smooth, cream-like paste results.

The zinc oxide powder is then incorporated with the eucalyptus-rosin paste by very gradual thorough spatulation until all of the powder is used, the resultant mass being a very thick sticky body.

The mass of material obtained by the foregoing process is then allowed to stand for approximately twenty-four hours after which it is rolled out under heavy pressure into a thin layer of approximately one millimeter in thickness. This application of pressure forms the mass into a more compact body and minimizes any possible tendency of the same toward shrinking.

The rolled layer of material is then cut into small narrow strips and formed into conical-shaped points of various sizes, similar in shape and size to the gutta-percha root canal points at present in use.

These formed points are now left in a temperature of about 72° for a period of from seven days to one month according to the condition of the atmosphere, to allow the bodies to gradually assume the proper consistency, which is accomplished through the volatilization of the eucalyptus. When the desired consistency is reached the points are sealed in an air-tight container until ready for use.

Applicant has extensively experimented in the preparation of this material and is aware of the fact that materials have been prepared with the object of obtaining the results obtained by applicant, by the use of other oils as for example oil of cloves but, due to the non-volatile condition of this oil the results produced by applicant have not been obtained and it has been found that oil of eucalyptus is the only one of oils of this class, that is, having antiseptic and preservative qualities, which has the proper volatile nature desired.

The canal filling points formed of a compound of the type herein described, have sufficient bonding qualities to preserve their shape and even to allow for a slight bending but, when the points are placed in the root canal and pressure is applied a breaking down and crumbling occurs and the operator is able then to force the material into all of the irregularities of the canal. Further and increased pressure upon the material will cause it, due to its slight stickiness, to again mass and form a solid body completely filling the canal. The condition of the material is such that it is plastic enough to pack firmly in the canal, but yet stiff enough to prevent overfilling of the canal that is, filling the canal beyond the end of the root, a condition which often is found in teeth filled with the usual root canal fitting materials. The substance after placing in the canal will not shrink, discolor the tooth, be affected by or absorb the body fluids, is non-irritating to tissue, will hermetically seal the canal and can be easily removed if necessary.

From the foregoing description it will be readily seen that the compound embodying this invention is of decided improvement over the compounds at present in use for filling the root canals of teeth in that, besides having the advantages above set forth, it can be prepared and used with such little trouble that a decided saving in time is made by the dental operator.

Having thus described my invention what I claim is:—

1. A tooth root canal filling consisting of a slightly plastic body formed of twelve minims of oil of eucalyptus, fourteen grains of zinc oxide and two grains of rosin and possessing a crumbling characteristic when initially pressed into the canal and solidifying upon further application of pressure thereto to form an impervious filling.

2. A method of manufacturing a tooth root canal filling possessing a crumbling characteristic when initially pressed into a canal and solidifying upon further application to pressure thereto to form an impervious filling consisting in forming a creamy compound of rosin, oil of eucalyptus and zinc oxide by spatulation, then allowing the compound to stand for a predetermined period, then subjecting the compound to a rolling action under heavy pressure to materially reduce the thickness thereof, then forming the thin compound in separate bodies, and then subjecting said bodies to a temperature of approximately seventy-two degrees F. for a predetermined period.

3. A tooth root canal filling comprising a slightly plastic body possessing a crumbling characteristic when initially pressed into the canal and solidifying upon further application of pressure thereto to form an impervious filling and formed from the spatulating of rosin, oil of eucalyptus and zinc oxide to provide a creamy mixture subsequently subjected to a rolling action under heavy pressure and with the rolled mixture subsequently subjected to a temperature of seventy-two degrees F. for a predetermined period.

In testimony whereof, I affix my signature hereto.

WINFIELD S. FISHER.